United States Patent
Bhamri et al.

(10) Patent No.: US 11,330,614 B2
(45) Date of Patent: May 10, 2022

(54) RADIO (NR) DEMODULATION REFERENCE SIGNAL (DMRS) PORTS MAPPING AND RELATED SIGNALING

(71) Applicant: Panasonic Intellectual Property Corporation of America, Torrance, CA (US)

(72) Inventors: Ankit Bhamri, Langen (DE); Hidetoshi Suzuki, Kanagawa (JP); Lilei Wang, Beijing (CN)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/786,727

(22) Filed: Feb. 10, 2020

(65) Prior Publication Data
US 2020/0178281 A1    Jun. 4, 2020

Related U.S. Application Data

(63) Continuation of application No. PCT/CN2017/097072, filed on Aug. 11, 2017.

(51) Int. Cl.
*H04W 72/12* (2009.01)
*H04L 5/00* (2006.01)
(Continued)

(52) U.S. Cl.
CPC ......... *H04W 72/1273* (2013.01); *H04L 5/005* (2013.01); *H04L 27/2607* (2013.01);
(Continued)

(58) Field of Classification Search
CPC ... H04L 5/005; H04L 5/0048; H04L 27/2607; H04W 72/1273; H04W 72/0446; H04W 72/06; H04W 76/27
See application file for complete search history.

(56) References Cited

U.S. PATENT DOCUMENTS

2011/0103324 A1\* 5/2011 Nam .................. H04W 72/042
370/329
2012/0300709 A1   11/2012 Su et al.
(Continued)

FOREIGN PATENT DOCUMENTS

CN    102088429 A    6/2011
CN    102781098 A    11/2012
(Continued)

OTHER PUBLICATIONS

Ericsson, Huawei, HiSi, [Intel], [Samsung], "WF on DMRS port to layer mapping for NC-JT," R1-1709316, Agenda item 6.2.4.1, 3GPP TSG RAN WG1 Meeting #89, Hangzhou, China, May 15-19, 2017, 3 pages.

(Continued)

*Primary Examiner* — Kent Krueger
(74) *Attorney, Agent, or Firm* — Seed IP Law Group LLP

(57) ABSTRACT

The present disclosure relates to a user device, a base station, a method for data transmission/reception by a user device, and a method for data reception/transmission by a base station. The user device comprises circuitry which, in operation, receives a parameter defining a rule for assigning to ports respective resources for carrying reference signals, generates, based on a mapping known to the user device and the base station, a set of layer-to-port mapping combinations, and receives, from the base station, control information indicating one of the set of layer-to-port mapping combinations which is to be applied for data transmission and/or reception.

19 Claims, 6 Drawing Sheets

(51) Int. Cl.
*H04W 76/27* (2018.01)
*H04L 27/26* (2006.01)
*H04W 72/04* (2009.01)
*H04W 72/06* (2009.01)

(52) U.S. Cl.
CPC ....... *H04W 72/0446* (2013.01); *H04W 72/06* (2013.01); *H04W 76/27* (2018.02)

(56) References Cited

U.S. PATENT DOCUMENTS

| | | | |
|---|---|---|---|
| 2016/0295526 | A1 | 10/2016 | Park et al. |
| 2017/0288835 | A1 | 10/2017 | Kim et al. |
| 2018/0026684 | A1* | 1/2018 | Wei .................. H04L 5/0007 370/329 |
| 2019/0013910 | A1 | 1/2019 | Zhang et al. |
| 2019/0140801 | A1* | 5/2019 | Ko .................... H04L 27/2613 |
| 2019/0182697 | A1* | 6/2019 | Zhang ................ H04B 7/088 |
| 2020/0204335 | A1* | 6/2020 | Kim .................. H04L 27/261 |
| 2020/0252254 | A1 | 8/2020 | Hasegawa et al. |

FOREIGN PATENT DOCUMENTS

| | | |
|---|---|---|
| CN | 106470088 A | 3/2017 |
| CN | 106549695 A | 3/2017 |
| JP | 2016-527767 A | 9/2016 |
| WO | 2016/048074 A1 | 3/2016 |
| WO | 2019/030894 A1 | 2/2019 |

OTHER PUBLICATIONS

Ericsson, ST-Ericsson, "Layer-to-antenna port mapping for LTE-Advanced," R1-100848, 3GPP TSG-RAN WG1 #60, San Francisco, USA, Feb. 22-26, 2010, 6 pages.

Extended European Search Report, dated Feb. 22, 2021, for European Application No. 17920959.8, 10 pages.

NEC, "Remaining details on DMRS ports and number of layers indication," R1-1710255, Agenda item: 5.1.2.1.1, 3GPP TSG RAN WG1 NR Ad-Hoc#2, Qingdao, China, Jun. 27-30, 2017, 3 pages.

ZTE, "Downlink control signaling for CoMP," R1-121047, Agenda Item: 7.5.5, 3GPP TSG RAN WG1 Meeting #68, Jeju, Korea, Mar. 26-30, 2012, 4 pages.

3GPP TR 38.801 V2.0.0, "3$^{rd}$ Generation Partnership Project; Technical Specification Group Radio Access Network; Study on New Radio Access Technology; Radio Access Architecture and Interfaces (Release 14)," Mar. 2017, 90 pages.

3GPP TR 38.913 V14.1.0, "3rd Generation Partnership Project; Technical Specification Group Radio Access Network; Study on Scenarios and Requirements for Next Generation Access Technologies; (Release 14)," Dec. 2016, 38 pages.

International Search Report, dated May 3, 2018, for corresponding International Application No. PCT/CN2017/097072, 2 pages.

LG Electronics, ZTE, "WF on signaling DMRS configuration," R1-1711771, Agenda item: 5.1.2.4.3, 3GPP TSG RAN WG1 NR Ad-Hoc#2, Qingdao, P.R. China, Jun. 27-30, 2017, 3 pages.

Mediatek et al., "WF on DMRS design," R1-1711784, Agenda item: 5.1.2.4.3, 3GPP TSG RAN WG1 Meeting NR Ad-Hoc#2, Qingdao, China, Jun. 27-30, 2017, 4 pages.

NTT Docomo, Inc., "Revised WID on New Radio Access Technology," RP-171485, Agenda Item: 9.2.1, 3GPP TSG RAN Meeting #75, West Palm Beach, USA, Jun. 5-8, 2017, 11 pages.

Sesia et al., "LTE The UMTS Long Term Evolution—From Theory to Practice," Wiley, Second Edition 2011, Section 8.2, Chapter 9.3.5, Section 11.2.2.2, and Section 29.1.1, 30 pages.

Nokia, Alcatel-Lucent Shanghai Bell, "On design of DL DM-RS for NR physical data channels," R1-1711305, Agenda Item: 5.1.2.4.3, 3GPP TSG RAN WG1 NR Ad-Hoc#2, Qingdao, P.R. China, Jun. 27-30, 2017, 8 pages.

Japanese Notice of Reasons for Rejection, dated Aug. 24, 2021, for Japanese Application No. 2020-504695, 15 pages. (English Translation).

ZTE, "Discussion on downlink DMRS design," R1-1710196, Agenda Item: 5.1.2.4.3, 3GPP TSG RAN WG1 NR Ad-Hoc#2, Qingdao, P.R. China, Jun. 27-30, 2017, 22 pages.

* cited by examiner

Fig. 4A

⊠ p1 (FDM1, FD-OCC [1,1])
   p4 (FDM1, FD-OCC [1,-1])

▦ p2 (FDM2, FD-OCC [1,1])
   p5 (FDM2, FD-OCC [1,-1])

▨ p3 (FDM3, FD-OCC [1,1])
   p6 (FDM3, FD-OCC [1,-1])

Fig. 4B

⊠ p1 (FDM1, FD-OCC [1,1])
   p2 (FDM1, FD-OCC [1,-1])

▦ p3 (FDM2, FD-OCC [1,1])
   p4 (FDM2, FD-OCC [1,-1])

▨ p5 (FDM3, FD-OCC [1,1])
   p6 (FDM3, FD-OCC [1,-1])

Fig. 5A

▨ p1 (FDM1, FD-OCC [1,1], TD-OCC [1,1])
  p4 (FDM1, FD-OCC [1,1], TD-OCC [1,-1])
  p7 (FDM1, FD-OCC [1,-1], TD-OCC [1,1])
  p10 (FDM1, FD-OCC [1,-1], TD-OCC [1,-1])

▦ p2 (FDM2, FD-OCC [1,1], TD-OCC [1,1])
  p5 (FDM2, FD-OCC [1,1], TD-OCC [1,-1])
  p8 (FDM2, FD-OCC [1,-1], TD-OCC [1,1])
  p11 (FDM2, FD-OCC [1,-1], TD-OCC [1,-1])

▩ p3 (FDM3, FD-OCC [1,1], TD-OCC [1,1])
  p6 (FDM3, FD-OCC [1,1], TD-OCC [1,-1])
  p9 (FDM3, FD-OCC [1,-1], TD-OCC [1,1])
  p12 (FDM3, FD-OCC [1,-1], TD-OCC [1,-1])

Fig. 5B

▨ p1 (FDM1, FD-OCC [1,1], TD-OCC [1,1])
  p2 (FDM1, FD-OCC [1,1], TD-OCC [1,-1])
  p3 (FDM1, FD-OCC [1,-1], TD-OCC [1,1])
  p4 (FDM1, FD-OCC [1,-1], TD-OCC [1,-1])

▦ p5 (FDM2, FD-OCC [1,1], TD-OCC [1,1])
  p6 (FDM2, FD-OCC [1,1], TD-OCC [1,-1])
  p7 (FDM2, FD-OCC [1,-1], TD-OCC [1,1])
  p8 (FDM2, FD-OCC [1,-1], TD-OCC [1,-1])

▩ p9 (FDM3, FD-OCC [1,1], TD-OCC [1,1])
  p10 (FDM3, FD-OCC [1,1], TD-OCC [1,-1])
  p11 (FDM3, FD-OCC [1,-1], TD-OCC [1,1])
  p12 (FDM3, FD-OCC [1,-1], TD-OCC [1,-1])

RADIO (NR) DEMODULATION REFERENCE SIGNAL (DMRS) PORTS MAPPING AND RELATED SIGNALING

BACKGROUND

1. Technical Field

The present disclosure relates to transmission and reception of data and/or reference signals in resources of a communication system.

2. Description of Related Art

Currently, the $3^{rd}$ Generation Partnership Project (3GPP) works at the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "*Study on New Radio Access Technology*" involving RAN1, RAN2, RAN3 and RAN4 was approved and is expected to become the Release 15 work item that defines the first 5G standard.

One objective of 5G NR is to provide a single technical framework addressing all usage scenarios, requirements and deployment scenarios defined in 3GPP TSG RAN TR 38.913 v14.1.0, *"Study on Scenarios and Requirements for Next Generation Access Technologies"*, December 2016 (available at www.3gpp.org and incorporated herein in its entirety by reference), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility. The backward compatibility to the Long Term Evolution (LTE) is not required, which facilitates a completely new system design and/or the introduction of novel features.

As summarized in one of the technical reports for the NR study item (3GPP TSG TR 38.801 v2.0.0, *"Study on New Radio Access Technology; Radio Access Architecture and Interfaces"*, March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

One of the design targets in NR is to seek the common waveform as much as possible for downlink, uplink and sidelink. It has been considered that introduction of the DFT spreading might not be needed for some cases of uplink transmission. The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

The term spatial layer (or layer) refers to one of different streams generated by spatial multiplexing. A layer can be described as a mapping of symbols onto the transmit antenna ports. Each layer is identified by a precoding vector of size equal to the number of transmit antenna ports and can be associated with a radiation pattern. The rank of the transmission is the number of layers transmitted. A codeword is an independently encoded data block, corresponding to a single Transport Block (TB) delivered from the Medium Access Control (MAC) layer in the transmitter to the physical layer, and protected with a cyclic redundancy check (CRC). Generally, a layer is assigned per transmission time (TTI) interval which in LTE corresponds to the subframe. However, in NR, there can be different TTIs, depending on URLLC or eMBB. In particular, in NR the TTI can be a slot, mini-slot, or subframe. For layers, ranks, and codewords, see also section 11.2.2.2 of S. Sesia, I. Toufik and M, Baker, LTE: The UMTS Long Term Evolution, Second Edition, incorporated herein by reference.

A reference signal pattern (RS) is transmitted from an antenna port (or port) at the base station. A port may be transmitted either as a single physical transmit antenna, or as a combination of multiple physical antenna elements. In either case, the signal transmitted from each antenna port is not designed to be further deconstructed by the UE receiver: the transmitted RS corresponding to a given antenna port defines the antenna port from the point of view of the UE, and enables the UE to derive a channel estimate for all data transmitted on that antenna port, regardless of whether it represents a single radio channel from one physical antenna or a composite channel from a multiplicity of physical antenna elements together comprising the antenna port. For ports, see also section 8.2 of S. Sesia, I. Toufik and M, Baker, LTE: The UMTS Long Term Evolution, Second Edition, incorporated herein by reference.

In LTE, the data transmissions and receptions for a UE are scheduled by the eNB by means of Physical Downlink Control Channel (PDCCH) which carries a message known as Downlink Control Information (DCI), which includes resource assignments and other control information for a UE or group of UEs. In general, several PDCCHs can be transmitted in a subframe.

The required content of the control channel messages depends on the system deployment and UE configuration. For example, if the infrastructure does not support MIMO, or if a UE is configured in a transmission mode which does not involve MIMO, there is no need to signal the parameters that are only required for MIMO transmissions. In order to minimize the signaling overhead, it is therefore desirable that several different message formats are available, each containing the minimum payload required for a particular scenario. On the other hand, to avoid too much complexity in implementation and testing, it is desirable not to specify too many formats. The set of DCI message formats specified in LTE is listed below:

Please refer to the mentioned technical standard or to LTE—The UMTS Long Term Evolution—From Theory to Practice, Edited by Stefanie Sesia, Issam Toufik, Matthew Baker, Chapter 9.3.5, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB (name for a base station in LTE) has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC. A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UE's assigned C-RNTI, semi-persistent scheduling (SPS C-RNTI), or initial allocation (temporary C-RNTI).

A DCI thus specifies the resources on which a UE is to receive or transmit data, including transmission and reception configuration.

BRIEF SUMMARY

One non-limiting and exemplary embodiment facilitates supporting flexible layer-to-port mapping and flexibly configure one-symbol or two-symbol DMRS within various front-loaded DMRS configurations while keeping a reasonable signaling overhead.

In one general aspect, the techniques disclosed here feature a user device for transmitting and/or receiving data to/from a base station using multiple antennas in a communication system comprising circuitry which, in operation, receives a parameter defining a rule for assigning to ports respective resources for carrying reference signals, generates, based on a mapping known to the user device and the base station, a set of layer-to-port mapping combinations, and receives, from the base station, control information indicating one of the set of layer-to-port mapping combinations which is to be applied for data transmission and/or reception.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIGS. 4A and 4B are diagrams of exemplary port numberings for an exemplary one-symbol DMRS configuration type.

FIGS. 5A and 5B are diagrams of exemplary port numberings for an exemplary two-symbol DMRS configuration type.

DETAILED DESCRIPTION

Figure 1A:
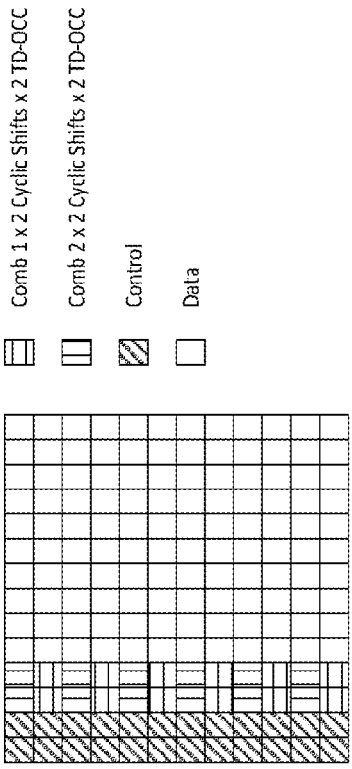
FIGS. 1A to 1D are schematic drawings of front loaded demodulation reference signal (DMRS) configuration types.

In 3$^{rd}$ generation partnership project new radio (3GPP NR), reference signals are re-designed to meet the wide range of requirements and use cases. Demodulation reference signals (DMRS) that are used for the purpose of channel estimation are also being designed to have a uniform structure for both uplink and downlink with cyclic-prefix orthogonal frequency division multiplexing (CP-OFDM) waveform. This disclosure relates to the front-loaded (at the beginning of the data channel) DMRS port mapping and related signaling aspects. It has already been agreed in that two configurations (with different multiplexing schemes for orthogonal DMRS ports) of front-loaded DMRS will be supported and each configuration with flexibility of using 1-symbol or 2-symbol DMRS. In current LTE, there is a fixed configuration with single category of multiplexing scheme for orthogonal DMRS ports and a rather rigid layer-to-port mapping is allowed. However in NR, it is expected to have a flexible layer-to-port mapping to leverage the benefits of different multiplexing schemes for orthogonal DMRS ports. In this disclosure, we provide a framework to flexibly configure port indexing, generate layer-to-port mapping and on how to indicate 1-symbol or 2-symbol DMRS for each configuration along with the table index.

This disclosure relates to NR technology. For on-going work item on NR access technology, see 3GPP TSG RAN Meeting #75, RP-171485 by NTT DoCoMo, "Revised WID on New Radio Access Technology", Jun. 5-8, 2017). More specifically, it deals with the aspects of front-loaded DMRS for both downlink and uplink with CP-OFDM waveform. In chairman notes from RAN1 NR #2 (RAN1 Chairman Notes: RAN1 NR Ad-Hoc #2, incorporated herein by reference), all the latest agreements related to DMRS are captured and this disclosure deals with some of the aspects that are not yet discussed or are left for further discussion. The disclosure provides a framework for flexible DMRS layer-to-port mapping and signaling of 1-symbol or 2-symbol DMRS within each front-loaded DMRS configuration.

As mentioned, in 3GPP NR, Demodulation Reference Signals (DMRS) are re-designed for both downlink and uplink.

According to latest agreements, two configurations are supported for front-loaded DMRS in downlink and uplink with CP-OFDM waveform, which are illustrated in FIGS. 1A to 1D. Front-loaded reference signals are allocated to the first data symbol adjacent to the signaling section (the signaling section consisting of, e.g., two symbols) of a TTI if one-symbol DMRS are used, i.e., and to the first two data symbols if two-symbol DMRS are used. In particular, the following relevant agreements related to NR DMRS are proposed in 3GPP TSG RAN WG1 Meeting NR Ad-Hoc #2, R1-1711784 Agenda item: 5.1.2.4.3, MediaTek et al., "WF on DMRS Design", Qingdao, China, 27-30 Jun. 27-30, 2017, incorporated herein by reference, and updated and agreed in the chairman notes which is incorporated herein by reference (available under www.3gpp.org).

The working assumption made in RAN1#89 for DM-RS is updated and agreed as follows for CP-OFDM: A UE is configured by higher layers with DMRS pattern either from the front-loaded DMRS Configuration type 1 or from the front-loaded DMRS Configuration type 2 for DL/UL.

Figure 1B:
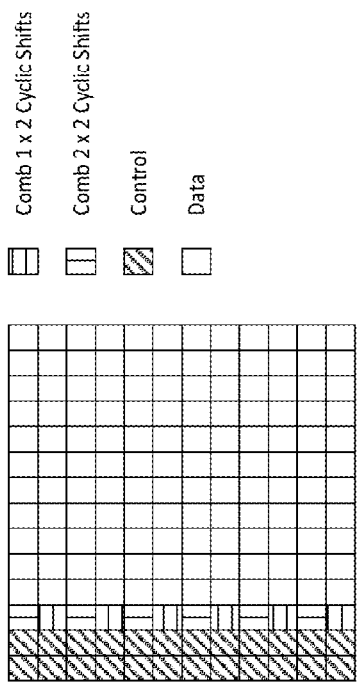

FIGS. 1A to 1B each show an exemplary grid corresponding to a slot of 14 symbols and 12 subcarriers. The first two symbols on the left of each of the figures corresponds to the signaling section of a slot. The physical downlink control channel (PDCCH) is signaled in the signaling section. In LTE, a subframe always includes two slots. However, in a general communication system, a subframe can correspond to a slot or include more than two slots. Moreover, the present disclosure is not limited to a slot having 14 symbols and 12 subcarriers.

The first front-loaded DMRS configuration corresponding to configuration type 1 is shown in FIGS. 1A and 1B. This configuration is aimed at support for up to eight orthogonal ports for Single-User Multiple Input Multiple Output (SU-MIMO) or Multi-User Multiple Input Multiple Output (MU-MIMO). The first configuration supports up to four orthogonal ports if one symbol DMRS are used, as shown in FIG. 1A. In particular, two combs and two cyclic shifts (CS) may be combined to form up to four component sets, and the respective resulting component sets can be respectively assigned to up to four ports. If two symbol DMRS are used, as shown in FIG. 1B, the two combs and two cyclic shifts may further be combined with two time division Orthogonal Cover Codes (TD-OCC) in particular Walsh-Hadamard TD-OCCs, ({1,1} and {1,−1}), and up to eight orthogonal ports may be supported. However, in the two-symbol DMRS case it should also be possible to schedule up to 4 ports without using both {1,1} and {1,−1}.

Figure 1C:
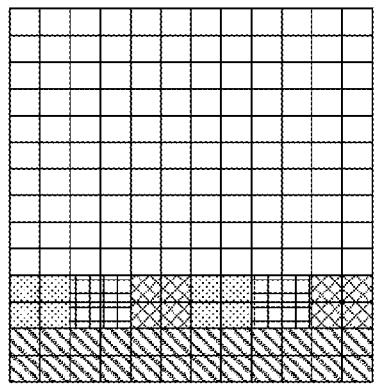
Figure 1D:
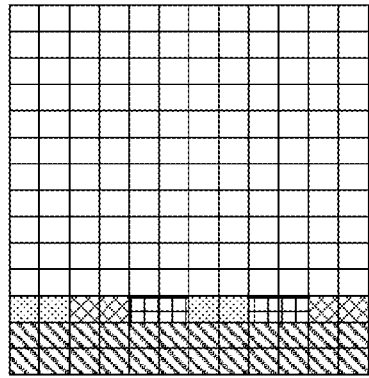

The second front-loaded DMRS configuration corresponding to configuration type 2 is shown in FIGS. 1C and 1D. This configuration provides support for up to twelve orthogonal ports for SU-MIMO or MU-MIMO. In particular, two (Walsh-Hadamard) frequency division Orthogonal Cover Codes (FD-OCC) respectively applied across adjacent Res (resource elements) in the frequency domain yield six component sets. As can be seen from FIGS. 1C and 1D, with twelve subcarriers, pairs of adjacent REs are grouped into three Frequency Division Multiplexing (FDM) groups. Accordingly, the six component sets result from two FD-OCCs (both {1,1} and {1,−1}) applied respectively to the three FDM groups. In the case of one symbol DMRS (FIG. 1C), the resulting six respective component sets can be assigned to up to six orthogonal ports. In the case of two-symbol DMRS, these six component sets may further be combined with two TD-OCCs resulting in a capability to support up to twelve orthogonal ports (FIG. 1D).

As described above with reference to FIGS. 1A to 1D, combs, cyclic shifts, FD-OCCs, FDMs, and TD-OCCs constitute resource components for reference signals, in particular front-loaded DMRS. These resource components are combined in accordance with the first or the second front-loaded DMRS configuration, and the resulting component sets are respectively assigned to orthogonal ports. However, usage of two-symbol DMRS should be possible even for lower ranks. Not all component sets that are supported by a particular configuration in the one-symbol or two symbol DMRS case need to be used for assignment of a port. In particular, also in the two-symbol case it should be possible to schedule up to 6 ports without using both {1,1} and {1,−1}.

From user equipment (UE) perspective, DMRS ports multiplexed by frequency domain code division multiplexing (CDM) are quasi co-located.

It is still open for further study whether the front-load DMRS configuration type for a UE for UL and DL can be different or not. Moreover, if there are significant complexity/performance issues involved in the above agreements, down-selection can still be discussed.

Furthermore, the following agreements were made related to the usage of 2-symbol DMRS for lower rank cases as well (for these agreements, see 3GPP TSG RAN WG1 Meeting NR Ad-Hoc #2 R1-1711771, Agenda Item:5.1.2.4.3, LG Electronics, ZTE, "WF on signaling DMRS configuration", Qingdao, China, 27-30 Jun. 27-30, 2017 incorporated herein by reference): The number of front-load DMRS symbols can be 1 or 2 when the number of DMRS ports allocated to UE is equal or less than N, N being 4 for configuration 1, and N being 6 for configuration 2. The details of determining whether one-symbol DMRS or two-symbol DMRS are used are still open for further study.

Current LTE DMRS Configuration

Figure 7:
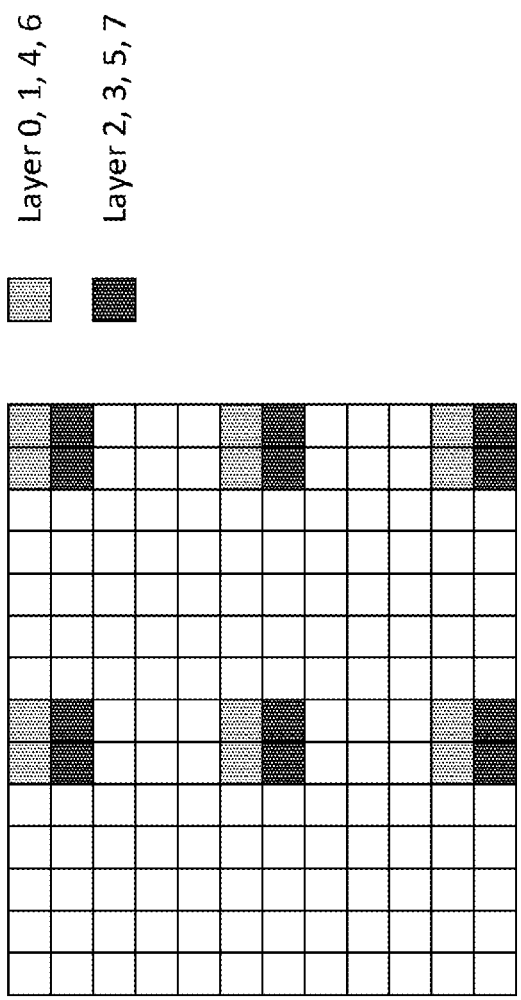
FIG. 7 is a diagram showing downlink demodulation reference signals (DMRS) with 8 orthogonal ports.

The DMRS configurations in NR described above are different from LTE, where there is a mainly a single configuration in downlink to support up to total 8 orthogonal ports/layers shown in FIG. 7 using code-division multiplexing in frequency and time using Walsh-Hadamard orthogonal cover codes. The configuration of FIG. 7 and further details on the DMRS configurations in LTE can be found in section 29.1.1 of S. Sesia, I. Toufik and M, Baker, LTE: The UMTS Long Term Evolution, Second Edition, incorporated herein by reference.

The table of layer-to port mapping in current LTE, which is taken from 3GPP TS 36.212, V14.3.0 (Table 5.3.3.1.5C-2) is shown in the Following Table 1:

TABLE 1

Antenna port(s), scrambling identity (SCID) and number of layers indication

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ (OCC = 2) | 0 | 2 layer, port 7-8, $n_{SCID}=0$ (OCC = 2) |
| 1 | 1 layer, port 7, $n_{SCID}=1$ (OCC = 2) | 1 | 2 layer, port 7-8, $n_{SCID}=1$ (OCC = 2) |
| 2 | 1 layer, port 8, $n_{SCID}=0$ (OCC = 2) | 2 | 2 layer, port 7-8, $n_{SCID}=0$ (OCC = 4) |
| 3 | 1 layer, port 8, $n_{SCID}=1$ (OCC = 2) | 3 | 2 layer, port 7-8, $n_{SCID}=1$ (OCC = 4) |
| 4 | 1 layer, port 7, $n_{SCID}=0$ (OCC = 4) | 4 | 2 layer, port 11, 13, $n_{SCID}=0$ (OCC = 4) |
| 5 | 1 layer, port 7, $n_{SCID}=1$ (OCC = 4) | 5 | 2 layer, port 11, 13, $n_{SCID}=1$ (OCC = 4) |
| 6 | 1 layer, port 8, $n_{SCID}=0$ (OCC = 4) | 6 | 3 layer, port 7-9 |
| 7 | 1 layer, port 8, $n_{SCID}=1$ (OCC = 4) | 7 | 4 layer, port 7-10 |
| 8 | 1 layer, port 11, $n_{SCID}=0$ (OCC = 4) | 8 | 5 layer, port 7-11 |
| 9 | 1 layer, port 11, $n_{SCID}=1$ (OCC = 4) | 9 | 6 layer, port 7-12 |
| 10 | 1 layer, port 13, $n_{SCID}=0$ (OCC = 4) | 10 | 7 layers, ports 7-13 |
| 11 | 1 layer, port 13, $n_{SCID}=1$ (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

In current LTE, up to eight orthogonal DMRS ports for downlink are supported, which mainly use a single category of multiplexing scheme, i.e., OCC in time/frequency. Therefore, any of the port combinations could be used for mapping layers without impacting the performance for a given scenario. Furthermore, for a given number of layers, usage of resources (DMRS overhead) is the same for any port combination.

Moreover, current LTE provides limited support for MU-MIMO. Also, a fixed DMRS configuration is supported; hence no additional signaling is required for dynamic configuration.

Furthermore, as can be seen from the Table 1, there are very limited combinations allowed for layer-to-port mapping. Length 4 bitmap is defined to signal the layer-to-port mapping for a given user in current LTE: A minimum number of port combinations are supported for layer-to-port mapping. In particular, for up to two layers, port-indexing for the mapping is consecutive and non-overlapping. For three to eight layers, the indexing is consecutive, non-overlapping, and starting from index 0 as a fixed start point. The mapping is limited to one port combination.

DMRS Requirements for NR

This might not be sufficient in NR due to the issues described in the next section. According to our knowledge, there are no solutions available than specifically deal with the issues related to DMRS port mapping and related signaling in NR, mainly due to the fact that the current agreements are very recent.

In NR, it will be required that DMRS configurations support a wide variety of scenarios including, among others, uplink, downlink, different carrier frequencies, and low latency. Mapping the layers of a user on to the orthogonal DMRS ports is expected to be flexible for the following reasons. Firstly, different ports may correspond to different type of multiplexing schemes whose performance might vary for different scenarios. Secondly, usage of resources (DMRS overhead) may be different for a given number of layers, if layer-to-port mapping is done in different ways. Thirdly, improved support for MU-MIMO is expected in comparison to that in current LTE (long term evolution). For each of the front-loaded DMRS configuration, it is expected to flexibly configure one-symbol or two-symbol DMRS.

In order to support flexible layer-to-port mapping for difference scenarios, it will be necessary to allow more port combinations, which consequently results in increased signaling overhead. Moreover, selecting either 1-symbol or 2-symbol DMRS for a given front-loaded DMRS configuration type would further increase the signaling overhead.

Based on these requirements, there is a need for support of flexible layer-to-port mapping and flexible configuration of one-symbol or more-symbol DMRS within different front-loaded DMRS configurations while allowing for a reasonable signaling overhead.

DETAILED DESCRIPTION

The present disclosure facilitates support of flexible layer-to-port mapping and flexible configuration of one-symbol or more-symbol DMRS within different front-loaded DMRS configurations while allowing for a reasonable signaling overhead.

Figure 2:
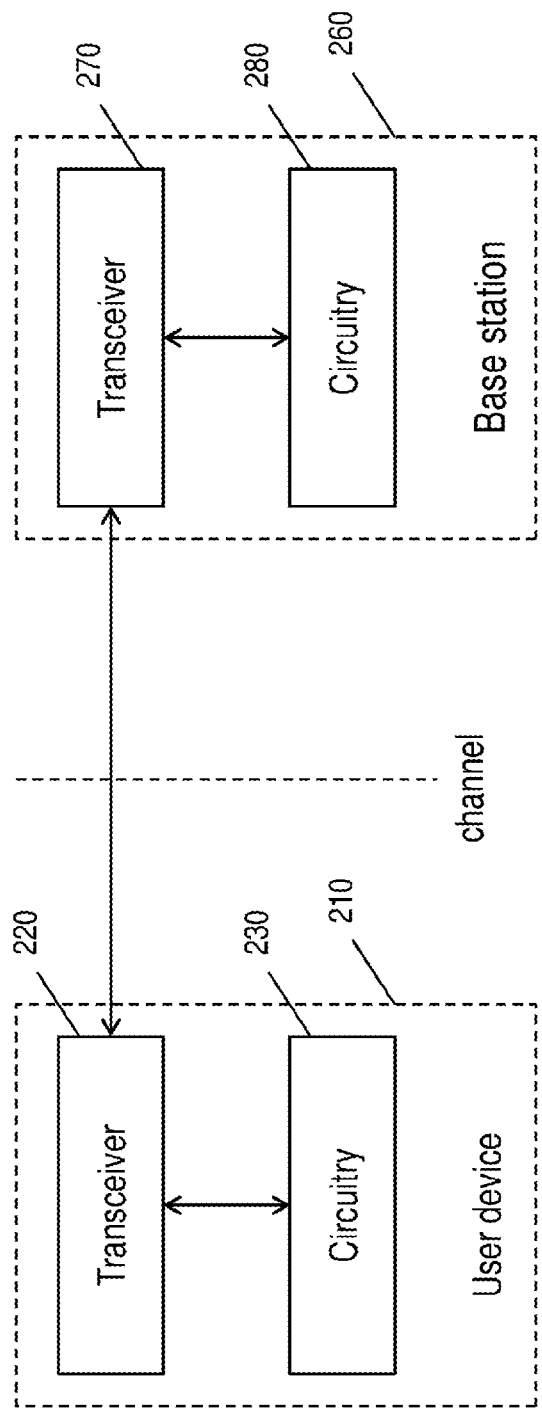
FIG. 2 is a block diagram showing the structure of a transmission device and a reception device.

In an exemplary embodiment, as shown in FIG. 2, the present disclosure provides a user device 210 for transmitting and/or receiving data to/from a base station 260 which uses multiple antennas in a communication system. The user device may correspond to a user equipment (UE), as it is usually named in LTE and NR. Usually, a wireless channel is used for transmission and/or reception. The user device comprises circuitry 230 which is adapted to receive a parameter to be used for assigning resources for reference signals to ports, generate a set of layer-to-port mapping combinations, and to receive, from the base station 260, control information indicating one of these mapping combinations which is to be applied for data transmission and/or reception.

In particular, the circuitry 230, in operation, receives a parameter which defines a rule for assigning to ports respective resources for carrying reference signals. The resources which are assigned to the ports generally include at least two resource components. For example, these resource components correspond to the combs, cyclic shifts, FD-OCCs, FDMs, in accordance with the respective configurations shown in FIGS. 1A to 1D.

Based on a mapping known to the user device 210 and the base station 260, the circuitry 230 of the user device 210, in operation, generates a set of layer-to-port mapping combinations. Therein, a layer-to-port mapping combination specifies per TTI how the layers used by a particular user terminal such as the user device 210 for data transmission or reception are mapped to ports which are available in a given port configuration.

Furthermore, the circuitry 230 of the user device 210, in operation receives control information from the base station 260 indicating one particular layer-to-port mapping combination from the set of layer-to-port mapping combinations which is to be applied for data transmission and or reception per TTI. That is, the indicated layer-to-port mapping combination defines the ports to which the layers used by the user device 210 for data transmission or reception are to be mapped. Therein, the TTI can for example be a slot, mini-slot, or subframe.

For instance, control information indicating the one layer-to-port mapping combination may be transmitted within the DCI on a PDCCH and be a part of scheduling configuration notifying the terminal to apply this particular layer-to-port mapping combination for transmission and/or reception of the data. In general, the DCI may serve for scheduling of the uplink or downlink data transmission (it is also possible, in general, to schedule both). Upon receiving the DCI, the UE configures the layers and ports in accordance with the received layer-to-port mapping combination and receives or transmits the data in the scheduled resources accordingly.

As shown in FIG. 2, the user device 210 comprises a transceiver 220, i.e., a transmitter and receiver for transmitting and receiving radio waves over a wireless channel. The transceiver 220, in operation, performs the data transmission and/or reception applying the indicated layer-to-port mapping combination which is indicated by the control information received from the base station.

Figure 6:
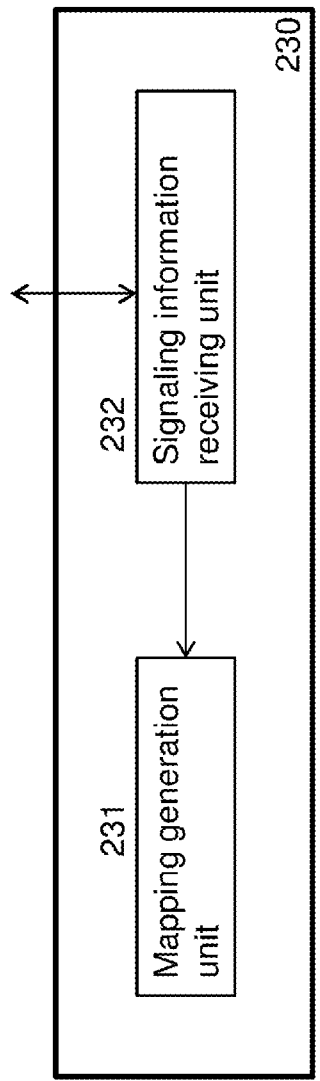
FIG. 6 is a block diagram showing circuitry of a user device.

The structure of the circuitry 230 of the user device 210 is shown in FIG. 6. The circuitry 230 of the user device comprises a signaling information receiving unit 232 and a mapping generation unit 231. The signaling information receiving unit 232 is configured to receive a parameter defining a rule for assigning to ports respective resources for carrying reference signals. The mapping generation unit 231 is configured to generate, based on a mapping known to the user device and the base station, a set of layer-to-port mapping combinations. The signaling information receiving unit 232 is further configured to receive, from the base station 260, control information indicating one of the set of layer-to-port mapping combinations which is to be applied for data transmission and/or reception. It should be noted that the transceiver 220 of the user device 210 receives radio waves transmitted over a wireless channel by the base station 260. The circuitry 230 of the user device receives already demodulated data and/or control data from a lower layer.

In correspondence with the user device 210, the present disclosure further provides a base station 260 for receiving and/or transmitting data from/to a user device in a communication system. The base station may be for instance an eNodeB (eNB) or a similar entity in NR (currently referred to as gNB). The present disclosure is also applicable to a relay node (either relay node handling as a base station described herein or as a user device described herein). The base station 260, or, more specifically, a transceiver 270 included in the base station 260, comprises multiple antennas which, in operation, transmit or receive the data. Moreover, the base station 260 comprises circuitry 280 which, in operation, transmits, via the transceiver 270, a parameter defining a rule for assigning to ports respective resources for carrying reference signals. The circuitry, 280 of the base station 260, in operation, further generates, based on a mapping known to the user device and the base station, a set of layer-to-port mapping combinations. Accordingly, the base station may perform scheduling of the UE, i.e., assign the UE resources for transmission or reception and provide the UE with the corresponding configuration to be applied for the transmission and reception parameters (such as modulation, coding, configuration of layers and ports and the like as described above with respect to DCI). The base station may perform the scheduling for one or more UEs. Furthermore, the circuitry 280 of the base station 260, in operation, transmits, via the transceiver 270, control information to the user device 210 indicating one of the set of layer-to-port mapping combinations which is to be applied by the user device 210 for data reception and/or transmission. The control information may be similar to the DCI. After transmitting the control information scheduling transmission of data for the UE in downlink, the base station will transmit the data in the downlink in the allocated resources and with the layer-to-port combination. After transmitting the control information scheduling transmission of data for the UE in uplink, the base station will receive the data in the uplink in the allocated resources and with the layer-to-port combination from the UE.

As shown in FIG. 2, the base station 260 comprises a transceiver 270, i.e., a transmitter and receiver for transmitting and receiving radio waves over a wireless channel. The transceiver 270, in operation, performs the reception and/or transmission of the data transmitted and/or by the user device 210 which applies the indicated layer-to-port mapping combination which is indicated by the control information received from the base station. The transceiver 270 comprises the multiple antennas of the base station.

For instance, the circuitry 280 of the base station 260, further configures the parameter defining the rule for assigning to ports respective resources for carrying reference signals. For example, the base station 260, using the circuitry 280, configures the parameter for defining the rule for port assignment, and transmits the parameter to plural user devices.

Furthermore, for instance, the circuitry 280 of the base station 260 may further configure the control information which is to be applied to the user device 210 or to plural user devices, in accordance with the respective numbers of layers of the user device 210 or plural user devices. Accordingly, the user device, for instance, sends the respective control information to the respective user devices.

For instance, the rule for assigning to ports respective resources for reference signals (the port assigning rule) further defines port indexing, in particular a port indexing/port numbering sequence, i.e., for each port and, accordingly, the particular set of resource components assigned to the given port, a port number (index) is determined by the port indexing sequence. If such a port indexing sequence is defined, the mapping on which the layer-to port mapping combinations are based can refer to the ports by their indices.

In particular, if the port assigning rule defines a port indexing, the mapping can specify, for instance the following:

1) layers of each layer-to-port mapping combination are mapped to consecutively indexed ports ("consecutive mapping"). That is, in each layer-to-port mapping combination, there is no gap between port indices.

2) each layer of a first configuration having a higher rank than a second configuration is mapped to a port having a smaller index than each port to which any layer of the second configuration is mapped, a rank being a number of layers of a configuration ("priority for higher rank"). That is, a user terminal having a higher rank (i.e., having more layers to be mapped onto ports, e.g., at least two layers) is mapped "first", i.e., to ports with smaller port numbers than another user terminal having a lower rank (e.g., only one layer).

When flexibility in layer-to-port mapping is increased, the above mapping principles 1) and 2) reduce the total available number of layer-to-port mapping combinations. Accordingly, if the layer-to-port mapping combinations are indexed, the number of indices for layer-to-port mapping combinations is reduced, and, in the control information, fewer bits are needed for indicating and signaling the respective indices corresponding to layer-to-port mapping combinations.

An example of the application of the layer-to-port mapping principles 1) and 2) is shown in Table 2. In each row, an index refers to a layer-to-port mapping combination, i.e., a number of layers of a given user device and the ports (port indices/numbers) to which they may be mapped. Mapping combinations which are excluded through principles 1) and 2) have been stricken through. Table 2 shows 4 orthogonal ports corresponding, for example to one-symbol DMRS of DMRS configuration 1 proposed for NR.

TABLE 2

Example for layer-to port mapping principles

| Index | No. of layers | Ports |
|---|---|---|
| 1 | 1 | P1 |
| 2 | 1 | P2 |
| 3 | 1 | P3 |
| 4 | 1 | P4 |
| 5 | 2 | P1,P2 |
| ~~6*~~ | ~~2~~ | ~~P1,P3~~ |
| ~~7*~~ | ~~2~~ | ~~P1,P4~~ |
| ~~8#~~ | ~~2~~ | ~~P2,P3~~ |
| ~~9*~~ | ~~2~~ | ~~P2,P4~~ |
| 10 | 2 | P3,P4 |
| 11 | 3 | P1,P2,P3 |
| ~~12*~~ | ~~3~~ | ~~P1,P2,P4~~ |
| ~~13*~~ | ~~3~~ | ~~P1,P3,P4~~ |
| ~~14#~~ | ~~3~~ | ~~P2,P3,P4~~ |
| 15 | 4 | P1,P2,P3,P4 |

For example, mapping principles 1) and 2) are combined. In Table 2, mapping configuration which are unavailable due to consecutive mapping (principle 1)), are marked by an asterisk. Configurations unavailable due to application of principle 2) ("priority for higher rank") in addition to principle 1) are marked by a hash. Principles 1) and 2).

However, as another example, each of the above layer-to-port mapping principles 1) and 2) can be applied alone.

Furthermore, the application of principles 1) and 2) is not limited to one-symbol DMRS configuration 1, as shown in Table 2. Similarly, they can be applied to other DMRS configuration with a higher number of ports, where the impact is even more significant, because with a higher total number of ports, more layer-to-port mapping combinations are available for exclusion through either of the principles 1) and 2). At the same time, due to the remaining available ports and the flexibility provided by the availability of configuration DMRS configuration types 1 and 2, a sufficient amount of flexibility may be provided.

For example, the reference signals are front-loaded reference signals, in particular front loaded DMRS. Accordingly, channel quality estimation based on the DMRS can be performed before demodulation of data, so that low latency for data demodulation may be achieved. However, the disclosure is not limited to front loaded reference signals. The DMRS could also be located on any symbols of the data frame.

The resources carrying the reference signals are located on one or more symbols in time domain. For instance, the reference signals can correspond to one-symbol DMRS or two-symbol DMRS, in accordance with the agreements made for NR. In the case of two-symbol DMRS, TD-OCC constitutes one of the resources for carrying the reference signals. However, the present disclosure is not limited to one-symbol or two-symbol reference signals, a larger number of symbols than two may be used for allocating the reference signals, either at the beginning of the data section (front-loaded) or elsewhere.

The mapping which is known to user device 210 and base station 260, for instance, implies indexing layer-to-port mapping combinations. In the example of Table 2, the resulting indexes of the layer-to-port mapping combinations correspond to the numbers in the "index" column of the table. In the example of table 2, there are 15 indexed layer-to-port mapping combinations all of which correspond to one-symbol DMRS.

However, in another example, the layer-to-port mapping combinations are continuously indexed including combinations with both one and more symbols in time domain. That is, a common index runs over the combinations with one-symbols and the combinations with two symbols. For example, the first (lower) indicate one-symbol combinations (e.g., indices 1 to 15), followed by indices for two-symbol configurations (e.g., indices 16 to 63), followed by three-symbol combinations (if available), etc. Having such a continuous index including both mapping combinations with one-symbol reference signals and more-symbol reference signals, by indicating a particular mapping configuration, it is implicitly indicated whether one-symbol reference signals, two-symbol reference signals, or any other number of symbols for reference signals is present.

For instance, the resources assigned to the ports include two resource components, in accordance with a first resource component configuration or a second resource component configuration. The first resource component configuration includes, as resource components a comb and a cyclic shift. A comb defines a distinction of subcarriers, subcarriers with alternating subcarrier indices being grouped to different combs. Accordingly, a first comb consists of subcarriers with an odd subcarrier index, and a second comb consists of subcarriers with an even subcarrier index. The second resource component configuration includes frequency division multiplexing and a frequency division orthogonal cover code, OCC. In particular, the first and the second resource component configuration may respectively correspond to configuration type 1 and configuration type 2 described above. The base station 260, in operation, configures which of the first and second resource component configuration is used, and transmits, to the user device 210, an indicator (i.e., signaling information) indicating whether the first resource component configuration or the second resource component configuration is used. The circuitry 230 of the user device 210, in operation, receives, via the transceiver 220 of the user device, the indicator. For instance, the indicator of the resource component configuration is transmitted/received via the Radio Resource Control (RRC) protocol which covers a number of functional areas such as system information, measurement configuration and reporting, etc.

More generally, the parameter defining a rule for assigning to ports respective resources for carrying reference signals, is, for example, transmitted by the base station, and received by the transmitter via the RRC protocol.

For instance, the resources assigned to the ports include either a cyclic shift or a frequency division orthogonal cover code. The circuitry 280 of the base station 260, for instance, configures assignment of a first cyclic shift or a frequency division orthogonal cover code applied to a first port, and assignment of a second cyclic shift or a frequency division orthogonal cover code applied to a second port different from the first cyclic shift or a frequency division orthogonal cover code. A first one of the multiple antennas, in operation, receives or transmits the data using the first port, and a second one of the multiple antennas, in operation, receives or transmits the data using the second port. The reference signals may be on-symbol or more-symbol reference signals, and in the case of more-symbol reference signals, the resources assigned to the ports, for instance, further include TD-OCC.

According to an example of the present disclosure, the base station 260 determines a carrier frequency (or carrier frequencies) assigned for transmission and/or reception by the user device 210, and transmits an indicator indicating which carrier frequency is assigned. The user device 210 receives the indicator. According to the carrier frequency assigned for transmission and/or reception, the circuitry 230 of the user device 210 configures whether each port is mapped to one symbol or the ports are mapped to one or two symbols.

Accordingly, two variants are disclosed with respect to the use of one-symbol DMRS for each port and the possibility of using both one-symbol DMRS and/or two-symbol DMRS. Variant 1 specifies no restriction on any multiplexing scheme for all frequencies; accordingly the ports are mapped to one or two symbols. Variant 2, on the other hand, does not allow two-symbol DMRS, and accordingly, TD-OCC, for carrier frequencies above a certain threshold, for instance 6 GHz.

For instance, the base station 260 transmits, and the user device 210 receives a carrier indicator field, CIF, specifying the carrier frequency assigned for transmission/reception. Accordingly, the circuitry 230 of the user device 210, in operation, configures, based on the frequency (or frequency interval) signaled via the CIF, whether each port is mapped to one symbol, in accordance with the above variant 2 or the ports are mapped to one or two symbols, in accordance with variant 2.

The present disclosure also provides a method for data transmission and/or reception by a user device 210 to/from a base station 260 using multiple antennas in a communication system. The method comprises the steps of receiving a parameter defining a rule for assigning to ports respective resources for carrying reference signals, generating, based on a mapping known to the user device and the base station, a set of layer-to-port mapping combinations, and receiving, from the base station, control information indicating one of the set of layer-to-port mapping combinations which is to be applied for data transmission and/or reception.

Moreover, the present disclosure provides a method for data reception and/or transmission by a base station 260 using multiple antennas from/to a user device 210 comprising transmitting a parameter defining a rule for assigning to ports respective resources for carrying reference signals, generating, based on a mapping known to the user device and the base station, a set of layer-to-port mapping combinations, and transmitting, to the user device, control information indicating one of the set of layer-to-port mapping combinations which is to be applied for data reception and/or transmission.

Figure 3:
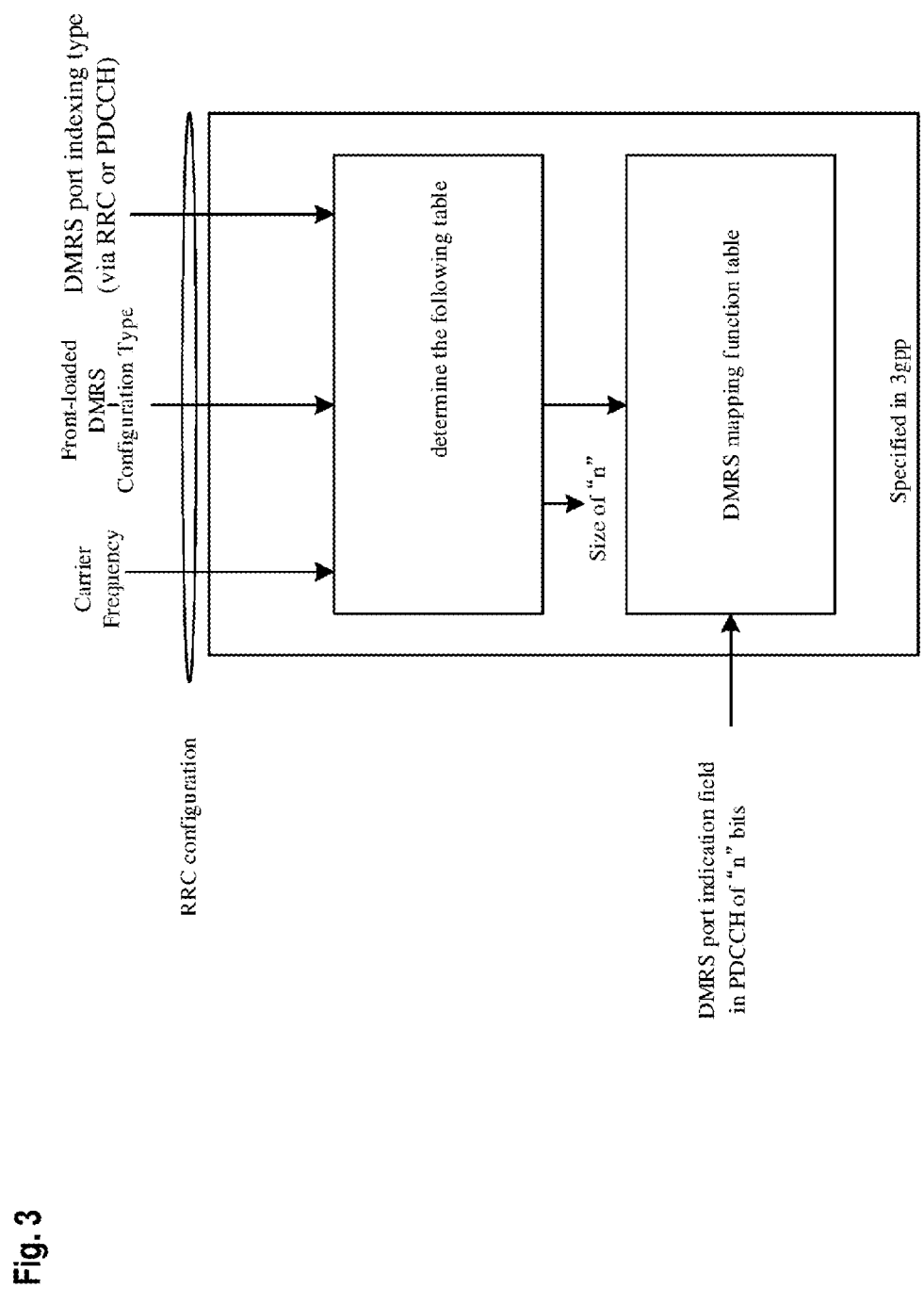
FIG. 3 is a block diagram showing a framework for DMRS port indexing, layer-to-port mapping and indication of one-symbol or two-symbol DMRS.

In a non-limiting and exemplary embodiment of the present disclosure, a framework is proposed that takes input parameters from system level information, RRC signaling and/or PDCCH signaling, utilizes these parameters and, based on pre-defined rules/principles to generate front-loaded DMRS port indexing sequence, layer-to-port mapping and indication of 1-symbol or 2-symbol front-loaded DMRS for a given configuration type. The disclosure includes 1. Defining and signaling of new parameters—DMRS port indexing type
2. Principle to generate flexible combinations of layer-to-port mapping
3. Signaling to indicate one-symbol or two-symbol front-loaded DMRS FIG. 3 shows an exemplary framework for DMRS port indexing, layer-to-port mapping and indication of one-symbol or two-symbol DMRS for each of the front-loaded DMRS configurations. The following steps are illustrated in FIG. 3.

1. The values of the following or more parameters are indicated at both the transmitter/receiver 220, 270 side, i.e., for data transmission and/or reception by the user device 210 and/or base station 260.
   a) The carrier frequency constitutes system information which is known at the transmitter or receiver.
   b) The front-loaded DMRS configuration type is signaled to the transmitter/receiver via RRC.
   c) The DMRS port indexing type is signaled by means of a new parameter to the transmitter/receiver via RRC or PDCCH.

Due to the new parameter according to c), the number of combinations for layer-to-port mapping may be increased by a factor of 2, without increasing control signaling overhead, if the parameter is configured via RRC.

2. Based on the above parameters, the port indexing sequence is defined and the orthogonal DMRS ports are numbered accordingly.

3. Following that, the layer-to-port mapping table listing a set of layer-to-port mapping combinations is generated on (a) pre-defined rule(s). In particular, the rules imply mapping principles 1) and 2).

This may provide an increased amount of flexibility in comparison to prior art, while keeping the overhead reasonable, especially for large numbers of orthogonal ports (for instance when resources to which ports are assigned include two-symbol DMRS). Moreover, orthogonal mapping for MU-MIMO can be achieved.

4. Based on the size of the table, a bitmap size is defined to accommodate the combinations.

5. PDCCH signaling is then used to indicate the layer-to-port indexing to a user for any given scenario.

As shown in FIG. 3, an aspect of the disclosure deals with a DMRS port indexing sequence. In current LTE, the DMRS ports are allocated a fixed number regardless of any scenario. For example ports with port numbers p7 to p14 are assigned to orthogonal DMRS ports in LTE downlink, as shown in section 29.1.1 of S. Sesia, I Toufik and M, Baker, LTE: The UMTS Long Term Evolution, Second Edition. However, according to this disclosure, the port number allocation should be flexible in NR as the multiplexing schemes are different on different ports. The ability to flexibly assign the port indexes adds another dimension to the issue of layer-to-port mapping combinations. In fact, the layer-to-port mapping table will be transparent to this flexibility in terms of DMRS port indexing. As a benefit, this increases the number of combinations for layer-to-port mapping by a factor of almost 2, without increasing the control signaling overhead when RRC configured.

Following that, it is disclosed that (a) rule(s) is/are defined to reduce the number of layer-to-port combinations considerably, while maintaining sufficient flexibility. There can be either a single rule or a set of rules to reduce the number of combinations. A generic principle can either be applied alone or combined with more strict rules to further reduce the number of combinations. In LTE, two separate tables are defined depending up on number of codewords for a given user. The proposed generic principle is applied such that it can be used along with such possibility of having separate tables for one or more codewords.

In the following, it is described how the signaling is handled to indicate the presence of one-symbol or two-symbol DMRS for a given front-loaded DMRS configurations. Below is shown a complete example for the proposed mechanism. In the example, the mechanism is applied to a DMRS configuration of configuration type 2 illustrated in FIGS. 1C and 1D. However, according to the present disclosure, the mechanism can analogously be applied to a configuration of configuration type 2.

1. First, the RRC signals, for example, the following parameter values:

Carrier Frequency: 4 GHz

Front-loaded DMRS configuration type: 2

Based on these parameters, two DMRS port indexing types (i.e., port numbering types) are shown for one-symbol and two-symbol DMRS with front-loaded DMRS configuration type 2, respectively:

One-symbol DMRS port indexing type 1 (FDM->FD-OCC) shown in FIG. 4A. This numbering type is suitable to exploit more diversity in frequency domain for the 2 or 3 port case.

One symbol DMRS port indexing type 2 (FD-OCC->FDM) shown in FIG. 4B. This numbering type is suitable to leave resources for data multiplexing for 2, 3 or 4 ports case.

Two-symbol DMRS port indexing type 1 (FDM->FD-OCC) shown in FIG. 5A. This numbering type is suitable to exploit more diversity in frequency domain for the 2 or 3 port case.

Two-symbol DMRS port indexing type 1 (FD-OCC+TD-OCC->FDM) shown in FIG. 5B. This numbering type is suitable to exploit more diversity in frequency domain for the 4 to 8 port case.

In FIGS. 4A, 4B, 5A, and 5B, the respective FDM groups are indicated in accordance with the respective indications in FIGS. 1C and 1D.

2. Second, the DMRS port indexing type 1 is selected, as configured, for instance, by RRC or PDCCH. For indexing type 1, the port indexing sequence is generated following the order FDM→FD-OCC (one-symbol DMRS) or FDM→FD-OCC+TD-OCC (two-symbol DMRS). For example, "FDM→FD-OCC" means that the port index first (P1 to P3) runs across all FDM groups for ports having the same FD-OCC (for instance $\{1,1\}$), then (P4 to P5) the port index again runs across the FDM groups in the same order for ports having the other one of FD-OCCs ($\{1,-1\}$). Analogously, in the case of FD-OCC→FDM, the index first runs, for example across $\{1,1\}$ ports with all FDM groups, then across all $\{1,-1\}$ ports keeping the same order of FDM groups. The disclosure is not limited to a particular order of FDM groups or FD-OCCs, for instance, the order of FD-OCCs may alternatively $\{1,-1\}$ first, $\{1,1\}$ second.

3. Then, Table with a layer-to-port mapping is generated: Based on the principle "higher rank are mapped first on consecutive DMRS ports, followed by lower rank in consecutive fashion", i.e., combination of the above layer-to-port mapping principles 1) and 2), the following tables are generated for both 1-symbol DMRS (Table 3) and 2-symbol DMRS, (Table 4) DMRS respectively. In the tables, "state" indicates an index of a layer-to.port mapping configuration, corresponding to the "index" column in Table 2.

TABLE 3

One-symbol Front-loaded DMRS Configuration 2 mapping

| State | No. of layers | Ports |
|---|---|---|
| 1 | 1 | P1 |
| 2 | 1 | P2 |
| 3 | 1 | P3 |
| 4 | 1 | P4 |
| 5 | 1 | P5 |
| 6 | 1 | P6 |
| 7 | 2 | P1,P2 |
| 8 | 2 | P3,P4 |
| 9 | 2 | P4,P5 |
| 10 | 2 | P5,P6 |
| 11 | 3 | P1-P3 |
| 12 | 3 | P4-P6 |
| 13 | 4 | P1-P4 |
| 14 | 5 | P1-P5 |
| 15 | 6 | P1-P6 |

TABLE 4

Two-symbol Front-loaded DMRS Configuration 2 mapping

| State | No. of layers | Ports |
|---|---|---|
| 1 | 1 | P1 |
| 2 | 1 | P2 |
| 3 | 1 | P3 |
| 4 | 1 | P4 |
| 5 | 1 | P5 |
| 6 | 1 | P6 |
| 7 | 1 | P7 |
| 8 | 1 | P8 |
| 9 | 1 | P9 |
| 10 | 1 | P10 |
| 11 | 1 | P11 |
| 12 | 1 | P12 |
| 13 | 2 | P1,P2 |

TABLE 4-continued

Two-symbol Front-loaded DMRS Configuration 2 mapping

| State | No. of layers | Ports |
|---|---|---|
| 14 | 2 | P3,P4 |
| 15 | 2 | P4,P5 |
| 16 | 2 | P5,P6 |
| 17 | 2 | P6,P7 |
| 18 | 2 | P7,P8 |
| 19 | 2 | P8,P9 |
| 20 | 2 | P9,10 |
| 21 | 2 | P10,P11 |
| 22 | 2 | P11,P12 |
| 23 | 3 | P1-P3 |
| 24 | 3 | P4-P6 |
| 25 | 3 | P5-P7 |
| 26 | 3 | P6-P8 |
| 27 | 3 | P7-P9 |
| 28 | 3 | P8-P10 |
| 29 | 3 | P9-P11 |
| 30 | 3 | P10-P12 |
| 31 | 4 | P1-P4 |
| 32 | 4 | P5-P8 |
| 33 | 4 | P6-P9 |
| 34 | 4 | P7-P10 |
| 35 | 4 | P8-P11 |
| 36 | 4 | P9-P12 |
| 37 | 5 | P1-P5 |
| 38 | 5 | P6-P10 |
| 39 | 5 | P7-P11 |
| 40 | 5 | P8-P12 |
| 41 | 6 | P1-P6 |
| 42 | 6 | P7-P12 |
| 43 | 7 | P1-P7 |
| 44 | 8 | P1-P8 |
| 45 | 9 | P1-P9 |
| 46 | 10 | P1-P10 |
| 47 | 11 | P1-P11 |
| 48 | 12 | P1-P12 |

It can be seen from Tables 3 and 4 that one-symbol DMRS has 15 states that can be indicated with 4-bit field and two-symbol DMRS has 48 states that can be indicated with 6-bit field (some states will be reserved). Moreover, if the states for both one-symbol DMRS and two-symbol DMRS are combined, i.e., continuously indexed by an index running over both one-symbol and two-symbol mapping configurations, then the total number will be 63, which can still be indicated by a 6-bit field. By generating an indexing sequence which combines the one-symbol and two-symbol layer-to-port mapping combinations of Tables 3, and, respectively, Table 4, and selecting an index from the combined indexing sequence, it is implicitly indicated whether one-symbol DMRS or 2-symbol DMRS are used. Therefore, no additional bit is required to explicitly signal the presence of 1-symbol or 2-symbol DMRS. Rather, a single bitmap is used to signal the layer-to-port to be applied for data transmission for both one-symbol DMRS and two-symbol DMRS of a given combination. Accordingly, an implicit way of indicating whether one-symbol DMRS or two-symbol DMRS is present, without the need for an additional bit, for example a flag indicating one/two-symbol DMRS.

In the following, an exemplary case with the above parameters is considered in which there are three users/user devices. User 1 has four layers, user 2 has six layers and user three has 2 layers. Accordingly, user 2 will be mapped on P1-P6, user 1 (i.e., the layers of user 1) will be mapped on P7-P10 and user 3 will be mapped on P11-P12 and following bitmap will be transmitted to each user respectively: (for combined states with single bitmap).

User 1: Index (15+34) 49->110001
User 2: Index (15+41) 55->110111
User 3: Index (15+22) 37->100101.

In the following, non-limiting examples of assignment of resources to ports in accordance configuration type and carrier frequency are provided.

For cm/mm wave frequency band (meaning the frequency band of higher frequencies above 6 GHz) and front-loaded DMRS configuration type 1, depending on the signaling of port order, "Comb->CS" or "CS->Comb" are selected when TD-OCC is not allowed otherwise "Comb->TD-OCC->CS" or "TD-OCC->CS->Comb" are selected, the higher rank are mapped first on consecutive DMRS ports, followed by lower rank in consecutive fashion and single bitmap is used for signaling.

For cm/mm wave frequency band and front-loaded DMRS configuration type 2, depending on the signaling of port order, "FDM->FD-OCC->ScID" or "FD-OCC->ScID->FDM" are selected when TD-OCC is not allowed otherwise "FDM->FD-OCC->TD-OCC" or "FD-OCC->TD-OCC->FDM" are selected, the higher rank are mapped first on consecutive DMRS ports, followed by lower rank in consecutive fashion and single bitmap is used for signaling.

For a frequency below the cm/mm wave frequency band and front-loaded DMRS configuration type 1, depending on the signaling of port order, "Comb->TD-OCC->CS" or "TD-OCC->CS->Comb" are selected, the higher rank are mapped first on consecutive DMRS ports, followed by lower rank in consecutive fashion and single bitmap is used for signaling.

For a frequency below the cm/mm wave frequency band and front-loaded DMRS configuration type 2, depending on the signaling of port order, "FDM->FD-OCC->TD-OCC" or "FD-OCC->TD-OCC->FDM" are selected, the higher rank are mapped first on consecutive DMRS ports, followed by lower rank in consecutive fashion and single bitmap is used for signaling.

DMRS port indexing types are also illustrated in Tables 5 and 6. More options could be possible as well, but are not necessarily needed.

TABLE 5

No restriction on any multiplexing scheme for all frequencies (variant 1)

| Carrier frequency | DMRS config. type | | DMRS port indexing type | DMRS port indexing sequence |
|---|---|---|---|---|
| Any Value | 1 | 1-symb | 1 | Comb -> Cyclic Shift |
| | | | 2 | Cyclic Shift -> Comb |
| | | 2-symb | 1 | Comb -> TD-OCC -> Cyclic Shift |
| | | | 2 | TD-OCC -> Cyclic Shift -> Comb |
| | 2 | 1-symb | 1 | FDM -> FD-OCC |
| | | | 2 | FD-OCC -> FDM |
| | | 2-symb | 1 | FDM -> FD-OCC + TD-OCC |
| | | | 2 | FD-OCC + TD-OCC -> FDM |

TABLE 6

TD-OCC not allowed for carrier frequencies
above 6 GHz (variant 2)

| Carrier frequency | DMRS config. type | DMRS port indexing type | DMRS port indexing sequence |
|---|---|---|---|
| cm/mm wave | 1 1-symb | 1 | Comb -> Cyclic Shift |
|  |  | 2 | Cyclic Shift -> Comb |
|  | 2 1-symb | 1 | FDM -> FD-OCC -> Scrambling (ScID) |
|  |  | 2 | FD-OCC -> Scrambling (ScID) -> FDM |

In a general aspect, the present disclosure provides a user device for transmitting and/or receiving data to/from a base station using multiple antennas, in a communication system. The user device comprises circuitry which, in operation, receives a parameter defining a rule for assigning to ports respective resources for carrying reference signals, generates, based on a mapping known to the user device and the base station, a set of layer-to-port mapping combinations, and receives, from the base station, control information indicating one of the set of layer-to-port mapping combinations which is to be applied for data transmission and/or reception.

This facilitates supporting flexible layer-to-port mapping and flexibly configure one-symbol or two-symbol DMRS within various front-loaded DMRS configurations while keeping a reasonable signaling overhead.

For instance, the rule further defines a port indexing sequence, and the mapping specifies that layers of each combination are mapped to consecutively indexed ports.

For example, the mapping further indicates that each layer of a first configuration having a higher rank than a second configuration is mapped to a port having a smaller index than each port to which any layer of the second configuration is mapped, a rank being a number of layers of a configuration.

These rules facilitate keeping a reasonable number of layer-to-port mapping combinations while providing, at the same time, flexible layer-to-port mapping.

In some embodiments, the resources carrying the reference signals are located on one or more symbols in time domain.

The mapping, for instance, implies indexing the layer-to-port mapping combinations, and the combinations are continuously indexed including combinations with both one and more symbols in time domain.

This provides a way of implicitly signaling whether combinations with one or more reference signals are used.

In some exemplary embodiments, the resources assigned to the ports include two resource components, a first resource component configuration including a comb and a cyclic shift of reference signals, the comb consisting either of subcarriers with an odd subcarrier index or of subcarriers with an even subcarrier index, a second resource component configuration including frequency division multiplexing and a frequency division orthogonal cover code, OCC, and the circuitry of the user device, in operation, further receives, from the base station, an indicator indicating whether the first resource component configuration or the second resource component configuration is used.

For instance, the parameter defining a rule for assigning to ports respective resources for carrying reference signals is received via the Radio Resource Control, RRC, protocol.

This facilitates increasing a number of layer-to-port mapping combinations without increasing the signaling overhead.

In some embodiments, the processing circuitry of the user device, in operation, configures, according to a carrier frequency assigned for transmission and/or reception, whether each port is mapped to one symbol or the ports are mapped to one or two symbols.

For example, the circuitry of the user device, in operation, further receives a carrier indicator field, CIF, specifying the carrier frequency.

In some embodiments, the reference signals being front loaded demodulation reference signals.

In some embodiments, the user device further comprises a transceiver which, in operation, performs the data transmission and/or reception applying the indicated layer-to-port mapping combination.

Further provided is a base station for receiving and/or transmitting data from/to a user device in a communication system comprising multiple antennas which, in operation, transmit or receive the data; and circuitry which, in operation, transmits a parameter defining a rule for assigning to ports respective resources for carrying reference signals, generates, based on a mapping known to the user device and the base station, a set of layer-to-port mapping combinations, and transmits, to the user device, control information indicating one of the set of layer-to-port mapping combinations which is to be applied for data reception and/or transmission.

In some embodiments, the parameter defining a rule for assigning to ports respective resources for carrying reference signals is transmitted via the Radio Resource Control, RRC, protocol.

Moreover, in some embodiments, the circuitry of the base station, in operation, further configures the parameter defining the rule for assigning to ports respective resources for carrying reference signals.

For example, the resources assigned to the ports include either a cyclic shift or a frequency division orthogonal cover code, and the circuitry, in operation, further configures assignment of a first cyclic shift or a frequency division orthogonal cover code applied to a first port, assignment of a second cyclic shift or a frequency division orthogonal cover code applied to a second port different from the first cyclic shift or a frequency division orthogonal cover code, a first one of the multiple antennas, in operation, receives or transmits the data using the first port, and a second one of the multiple antennas, in operation, receives or transmits the data using the second port.

According to another general aspect, a method is disclosed for data transmission and/or reception by a user device to/from a base station using multiple antennas in a communication system comprising the method steps of receiving a parameter defining a rule for assigning to ports respective resources for carrying reference signals, generating, based on a mapping known to the user device and the base station, a set of layer-to-port mapping combinations, and receiving, from the base station, control information indicating one of the set of layer-to-port mapping combinations which is to be applied for data transmission and/or reception.

Further disclosed is a method for data reception and/or transmission by a base station using multiple antennas from/to a user device comprising transmitting a parameter defining a rule for assigning to ports respective resources for carrying reference signals, generating, based on a mapping known to the user device and the base station, a set of layer-to-port mapping combinations, and transmitting, to the user device, control information indicating one of the set of layer-to-port mapping combinations which is to be applied for data reception and/or transmission.

Summarizing, the present disclosure relates to a user device, a base station, a method for data transmission/reception by a user device, and a method for data reception/transmission by a base station. The user device comprises circuitry which, in operation, receives a parameter defining a rule for assigning to ports respective resources for carrying reference signals, generates, based on a mapping known to the user device and the base station, a set of layer-to-port mapping combinations, and receives, from the base station, control information indicating one of the set of layer-to-port mapping combinations which is to be applied for data transmission and/or reception.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment for transmitting and/or receiving data to/from a base station using multiple antennas in a communication system, the user equipment comprising:
   a receiver, which, in operation,
      receives a parameter defining a configuration for assigning to ports respective resources for carrying reference signals, and
      receives, from the base station, control information indicating one of a set of layer-to-port mapping combinations which is to be applied for data transmission and/or reception; and
   circuitry, which, in operation, performs the data transmission and/or reception based on the indicated layer-to-port mapping combination,
   wherein the resources carrying the reference signals are located on one or more symbols in a time domain,
      wherein the set of layer-to-port mapping combinations are continuously indexed including one-symbol layer-to-port mapping combinations for the reference signals located on one symbol and two-symbol layer-to-port mapping combinations for the reference signals located on two symbols,
   wherein first indices of the continuous indices indicate the one-symbol layer-to-port mapping combinations followed by second indices for the two-symbol layer-to-port mapping combinations, and
   wherein, of the set of layer-to-port mapping combinations, the two-symbol layer-to-port mapping combinations for n layers (where n is 2 or more) include a mapping combination having consecutive port numbers of which at least one port number is duplicated in another mapping combination for the same n layers which is continuously indexed.

2. The user equipment according to claim 1, wherein the configuration further defines a port indexing sequence, and
   the mapping specifies that layers of each combination are mapped to consecutively indexed ports.

3. The user equipment according to claim 2, wherein the mapping further indicates that each layer of a first configuration having a higher rank than a second configuration is mapped to a port having a smaller index than each port to which any layer of the second configuration is mapped, a rank being a number of layers of a configuration.

4. The user equipment according to claim 1, wherein the resources assigned to the ports are configurable in two resource component configurations,
   a first resource component configuration including a comb and a cyclic shift of reference signals, the comb consisting either of subcarriers with an odd subcarrier index or of subcarriers with an even subcarrier index,
   a second resource component configuration including frequency division multiplexing and a frequency division orthogonal cover code (OCC), and
   the receiver, in operation, further receives, from the base station, an indicator indicating whether the first resource component configuration or the second resource component configuration is used.

5. The user equipment according to claim 1, wherein the parameter defining a configuration for assigning to ports respective resources for carrying reference signals is received via a Radio Resource Control (RRC) protocol.

6. The user equipment according to claim 1, wherein the circuitry, in operation, configures, according to a carrier frequency assigned for transmission and/or reception, whether each port is mapped to one symbol or the ports are mapped to one or two symbols.

7. The user equipment according to claim 6, wherein the receiver, in operation, further receives a carrier indicator field (CIF) specifying the carrier frequency.

8. The user equipment according to claim 1, wherein the reference signals are front loaded demodulation reference signals.

9. The user equipment according to claim 1, further comprising a transmitter which, in operation, performs the data transmission applying the indicated layer-to-port mapping combination.

10. A base station for receiving and/or transmitting data from/to a user equipment in a communication system, the base station comprising:
    a transmitter, which, in operation,
       transmits a parameter defining a configuration for assigning to ports respective resources for carrying reference signals, and
       transmits, to the user equipment, control information indicating one of a set of layer-to-port mapping combinations which is to be applied for data reception and/or transmission; and
    circuitry, which, in operation, performs the data transmission and/or reception based on the indicated layer-to-port mapping combination,
    wherein the resources carrying the reference signals are located on one or more symbols in a time domain,
       wherein the set of layer-to-port mapping combinations are continuously indexed including one-symbol layer-to-port mapping combinations for the reference signals located on one symbol and two-symbol layer-to-port mapping combinations for the reference signals located on two symbols, wherein first indices of the continuous indices indicate the one-symbol layer-to-port mapping combinations followed by second indices for the two-symbol layer-to-port mapping combinations, and wherein, of the set of layer-to-port mapping combinations, the two-symbol layer-to-port mapping combinations for n layers (where n is 2 or more) include a mapping combination having consecutive port numbers of which at least one port number is duplicated in another mapping combination for the same n layers which is continuously indexed.

11. The base station according to claim 10, wherein the parameter defining a configuration for assigning to ports respective resources for carrying reference signals is transmitted via a Radio Resource Control (RRC) protocol.

12. The base station according to claim 10, wherein the circuitry, in operation, further configures the parameter defining the configuration for assigning to ports respective resources for carrying reference signals.

13. The base station according to claim 10, wherein the resources assigned to the ports include either a cyclic shift or a frequency division orthogonal cover code, and the circuitry, in operation, further configures assignment of a first cyclic shift or a frequency division orthogonal cover code applied to a first port, and assignment of a second cyclic shift or a frequency division orthogonal cover code applied to a second port, wherein, a first one of the multiple antennas, in operation, receives or transmits the data using the first port, and a second one of the multiple antennas, in operation, receives or transmits the data using the second port.

14. A method for data transmission and/or reception by a user equipment to/from a base station using multiple antennas in a communication system, the method comprising receiving a parameter defining a configuration for assigning to ports respective resources for carrying reference signals, receiving, from the base station, control information indicating one of a set of layer-to-port mapping combinations which is to be applied for data transmission and/or reception, and performing the data transmission and/or reception based on the indicated layer-to-port mapping combination, wherein the resources carrying the reference signals are located on one or more symbols in a time domain, wherein the set of layer-to-port mapping combinations are continuously indexed including one-symbol layer-to-port mapping combinations for the reference signals located on one symbol and two-symbol layer-to-port mapping combinations for the reference signals located on two symbols, wherein first indices of the continuous indices indicate the one-symbol layer-to-port mapping combinations followed by second indices for the two-symbol layer-to-port mapping combinations, and wherein, of the set of layer-to-port mapping combinations, the two-symbol layer-to-port mapping combinations for n layers (where n is 2 or more) include a mapping combination having consecutive port numbers of which at least one port number is duplicated in another mapping combination for the same n layers which is continuously indexed.

15. A method for data reception and/or transmission by a base station using multiple antennas from/to a user equipment, the method comprising transmitting a parameter defining a configuration for assigning to ports respective resources for carrying reference signals, transmitting, to the user equipment, control information indicating one of the set of layer-to-port mapping combinations which is to be applied for data reception and/or transmission, and performing the data transmission and/or reception based on the indicated layer-to-port mapping combination, wherein the resources carrying the reference signals are located on one or more symbols in a time domain, wherein the set of layer-to-port mapping combinations are continuously indexed including one-symbol layer-to-port mapping combinations for the reference signals located on one symbol and two-symbol layer-to-port mapping combinations for the reference signals located on two symbols, wherein first indices of the continuous indices indicate the one-symbol layer-to-port mapping combinations followed by second indices for the two-symbol layer-to-port mapping combinations, and wherein, of the set of layer-to-port mapping combinations, the two-symbol layer-to-port mapping combinations for n layers (where n is 2 or more) include a mapping combination having consecutive port numbers of which at least one port number is duplicated in another mapping combination for the same n layers which is continuously indexed.

16. The user equipment according to claim 1, wherein consecutively indexed ports are mapped in the one-symbol layer-to-port mapping and/or in the two-symbol layer-to-port mapping combinations.

17. The base station according to claim 10, wherein consecutively indexed ports are mapped in the one-symbol layer-to-port mapping and/or in the two-symbol layer-to-port mapping combinations.

18. The method according to claim 14, wherein consecutively indexed ports are mapped in the one-symbol layer-to-port mapping and/or in the two-symbol layer-to-port mapping combinations.

19. The method according to claim 15, wherein consecutively indexed ports are mapped in the one-symbol layer-to-port mapping and/or in the two-symbol layer-to-port mapping combinations.

* * * * *

UNITED STATES PATENT AND TRADEMARK OFFICE
CERTIFICATE OF CORRECTION

PATENT NO. : 11,330,614 B2
APPLICATION NO. : 16/786727
DATED : May 10, 2022
INVENTOR(S) : Ankit Bhamri et al.

It is certified that error appears in the above-identified patent and that said Letters Patent is hereby corrected as shown below:

On the Title Page

Item (54) and in the Specification, Column 1, Line 1-3:
"RADIO (NR) DEMODULATION REFERENCE SIGNAL (DMRS) PORTS MAPPING AND RELATED SIGNALING"
Should read:
--NEW RADIO (NR) DEMODULATION REFERENCE SIGNAL (DMRS) PORTS MAPPING AND RELATED SIGNALING--.

Signed and Sealed this
Fourteenth Day of June, 2022

Katherine Kelly Vidal
*Director of the United States Patent and Trademark Office*